United States Patent [19]

Link

[11] Patent Number: 4,677,719
[45] Date of Patent: Jul. 7, 1987

[54] TOOL HOLDING DEVICE FOR LATHES

[75] Inventor: Helmut F. Link, Aichwald, Fed. Rep. of Germany

[73] Assignee: Index-Werke Komm.-Ges. Hahn & Tessky, Fed. Rep. of Germany

[21] Appl. No.: 831,354

[22] Filed: Feb. 20, 1986

[30] Foreign Application Priority Data

Mar. 16, 1985 [DE] Fed. Rep. of Germany ....... 3509635

[51] Int. Cl.$^4$ .......................... B23B 3/22; B23C 5/26
[52] U.S. Cl. ......................................... 29/40; 409/233
[58] Field of Search .......................... 29/39, 40, 27 R; 409/233, 231, 232; 408/239 A, 239 R, 238

[56] References Cited

U.S. PATENT DOCUMENTS

| 4,131,054 | 12/1978 | Johnson et al. | 409/233 |
| 4,199,286 | 4/1980 | Kirkham | 409/233 |
| 4,303,360 | 12/1981 | Cayen et al. | 409/233 |
| 4,413,938 | 11/1983 | Kuczenski | 409/233 |
| 4,553,886 | 11/1985 | Vasilchenko et al. | 409/233 |

FOREIGN PATENT DOCUMENTS

| 2532572 | 3/1984 | France | 409/233 |
| 1093431 | 5/1984 | U.S.S.R. | 409/233 |

Primary Examiner—William R. Briggs
Attorney, Agent, or Firm—Shenier & O'Connor

[57] ABSTRACT

A tool carrier for lathes, in particular a tool turret, having a plurality of stations for holding tools, at least one of which is provided with a driven tool spindle designed as a hollow shaft and rotatably mounted in a housing. This tool spindle accommodates a tool chuck which is coaxial to and non-rotatably connected with the tool spindle and is displaceable in axial direction relative to the tool spindle for opening and closing. The tool carrier also has a threaded spindle connected in axial direction with the chuck and a nut arranged thereon for opening and closing the chuck. To simplify the construction only one drive shaft is provided and this shaft is constantly coupled with the nut and connected with the tool spindle via a releasable coupling.

9 Claims, 6 Drawing Figures

TOOL HOLDING DEVICE FOR LATHES

The invention relates to a tool holding device for a tool carrier, in particular a tool turret, for lathes, this tool holding device having a drivable tool spindle on which a tool may be mounted so as to be interchangeable.

In the course of automation of workpiece machining in lathes, automatic tool changing systems are increasingly being used. These exchange worn or broken tools. Since, in modern lathes, not only stationary lathe tools are used but also rotary tools, the tool changing system should also be able to change tools held in driven tool spindles of a tool carrier. This has, however, caused considerable problems up to now as the tool carriers, in particular rotatable tool turrets, which are used on the lathes are almost all indexable. These have to be designed such that one or more tool spindles of the tool carrier or tool turret can be optionally driven so that a tool may be changed, or locked in position. In this respect, it should be possible for the tool spindle of a tool which is to be interchanged to be stopped and locked in a predetermined angular position so that a gripping means of the tool changing system can easily grasp the tool to be changed.

In the case of known constructions, which fulfill these requirements, each tool spindle of the tool carrier is provided with a drive system for driving the tool spindle itself and a second drive system for actuating the tool clamping means. The latter has a threaded spindle and a nut cooperating therewith for clamping or releasing the tool. When the tool turret station carrying the relevant tool spindle is located in its machining position or its tool changing position, respectively, the first drive system is coupled with a work motor for machining a workpiece whereas the second drive system is coupled with a second motor when a tool is to be changed. This causes the tool clamping means to be released or, following the tool change, the new tool to be firmly clamped. In this known construction, the movement which causes the second drive system to be coupled with the second motor also effects blocking of the tool spindle. The state of the art not only requires substantial constructional resources, which entail correspondingly high costs, but it also leads to sizeable difficulties in the case of tool spindles which are not coaxial but extend at an angle to their drive shafts. In this case deflector means are then required for each of the two drive systems. This known principle can also be used only with so-called disc turrets, with which the two motors may be individually coupled with the ends of the two drive systems of each tool spindle. On the other hand, there is still no marketable construction for so-called star turrets, with which the tool spindles extending radially to the indexing axis of the tool turret are driven by a common central bevel gear.

The object underlying the invention was therefore to create a tool holding device of the type described at the outset which is constructed in a simpler manner than the known constructions described above and the tool spindle drive system of which as well as the actuating system for the tool changing means are suitable for use on all types of tool turrets.

This object is accomplished on the basis of a tool holding device for a tool carrier, in particular a tool turret, for lathes, comprising a driven tool spindle rotatably mounted in a housing and designed as a hollow shaft, the tool spindle having a tool clamping device provided with a seat for a tool, the tool being clamped against the seat in axial direction, and a first threaded element arranged in the tool spindle coaxially thereto and rotatable relative to the tool spindle about the axis thereof, this threaded element being rotatable relative to a second threaded element for the purpose of clamping a tool, the tool holding device hereby having a drive element coaxial to the tool spindle for driving the tool spindle. In accordance with the invention, a tool holding device of this type is designed such that the first threaded element is also adapted to be driven by the drive element and a releasable coupling means is provided between the drive element and the tool spindle. This dispenses with the second drive system of the known constructions described above. This means that the tool clamping means can be released, for changing the tool, and clamped again by the same motor which drives the work spindle during machining of a workpiece. Embodiments are preferred in which the releasable coupling means is arranged immediately between the drive element and the tool spindle.

The tool clamping device may have a customary tool chuck connected with a threaded element in an axial direction of the tool spindle. This threaded element which is rotatable by means of the drive element for opening and/or closing the chuck (the chuck could be actuated in the other respective direction by, for example, a spring). The invention may also be used on completely different tool clamping devices, for example those in which a tool shank is provided at its rear end with a threaded bore into which a threaded bolt of the tool clamping device may be screwed. This threaded bolt forms the first threaded element within the definition of the present invention and may be caused to rotate by the drive element. It is then merely necessary to support this threaded bolt axially on the tool spindle in the direction towards the tool, e.g. with an annular flange, a head or the like, so that the tool shank may be clamped in an axial direction against a seat formed by the tool spindle due to rotation of the threaded bolt in the tool spindle to secure the tool shank against rotation on the tool spindle and to position the tool exactly in relation to the tool holding device. The seat may be, in particular, a planar toothing, known as a Hirth toothing. Embodiments are, however, preferred in which the first threaded element is nondisplaceably connected with the work spindle in both axial directions. Finally, it should be noted that the second threaded element could be the tool spindle itself. In this case, the first threaded element would have to be designed such that it may be connected in axial direction with the tool to be clamped so that by turning the first threaded element in the tool spindle the latter is displaced in axial direction relative to the tool and the tool clamped in this manner.

In order to be able to lock the work spindle in position in a particularly simple manner for clamping a tool, the coupling of a preferred embodiment of the inventive tool holding device includes a first state in which the drive element is coupled with the tool spindle whereas in a second state of the coupling means the tool spindle is coupled with the housing and thereby locked in position. Actuation of the coupling for the purpose of disengaging the tool spindle from its drive means is therefore utilized at the same time to couple the tool spindle with the housing and lock it in position in this way so that a second movement for locking the tool spindle is not necessary.

The coupling can, in principle, be any type of coupling. A particularly simple construction of the inventive tool carrier results when the coupling means has a coupling sleeve coaxial to the tool spindle, the sleeve being displaceable over or in engaging zones of the tool spindle and the drive element for coupling this drive element with this tool spindle and being positively connectable with the engaging zones in the direction of rotation. The coupling sleeve could, for example, be equipped with pins which extend through bores in flanges in the drive element and the tool spindle when the tool spindle is engaged and thus positively connect these two elements with one another in the direction of rotation. It is, however, simpler for the coupling sleeve and the two engaging zones to be provided with sets of teeth which slide into one another.

In order to lock the tool spindle in a predetermined position of angular rotation for the purpose of changing a tool, it is suggested that the coupling sleeve and the housing each be provided with at least one locking element designed in such a manner that the coupling sleeve is non-rotatably connectable with the housing in at least one defined position of angular rotation due to axial displacement. The locking elements can be, for example, a tooth and a corresponding recess into which the tooth may be inserted when the coupling sleeve is displaced.

In order to be able to release the first threaded element reliably when a tool is to be changed, a preferred embodiment of the inventive tool holding device proceeds on the principle of a drive screw in that the first threaded element is coupled with the drive element via coupling means having clearance in the direction of rotation. When the drive element is driven in a first direction during machining of a workpiece, the tool spindle disengaged and locked in position and, finally, the direction of rotation of the drive element reversed, the latter does not drive the first threaded element until it has overcome this clearance and so it applies a considerable impact torque to the first threaded element. A further advantage of this construction and its actuation, as described, is that, due to the clearance present, the first threaded element cannot inadvertently work loose when the tool is subjected to impact stress during machining of a workpiece.

A particularly simple and space-saving construction results when a nut is arranged in the tool spindle as first threaded element so as to be rotatable on a threaded journal connectable in axial direction with a tool to be clamped. In addition, the simplest way to bring about the desired permanent connection between drive element and first threaded element, which may, if required, be provided with clearance, is to have the first threaded element constantly in drive connection with the drive element via stops acting in both directions of rotation. Appropriately, this drive connection always has clearance in both directions of rotation.

Additional features, advantages and details of the invention are shown in the attached drawings as well as the following description of five preferred embodiments of the inventive tool holding device. In the drawings, FIG. 1 is an axial section through a tool spindle accommodated in a so-called star turret, the sectional plane hereby including the indexing axis of the tool turret;

Figure 1:
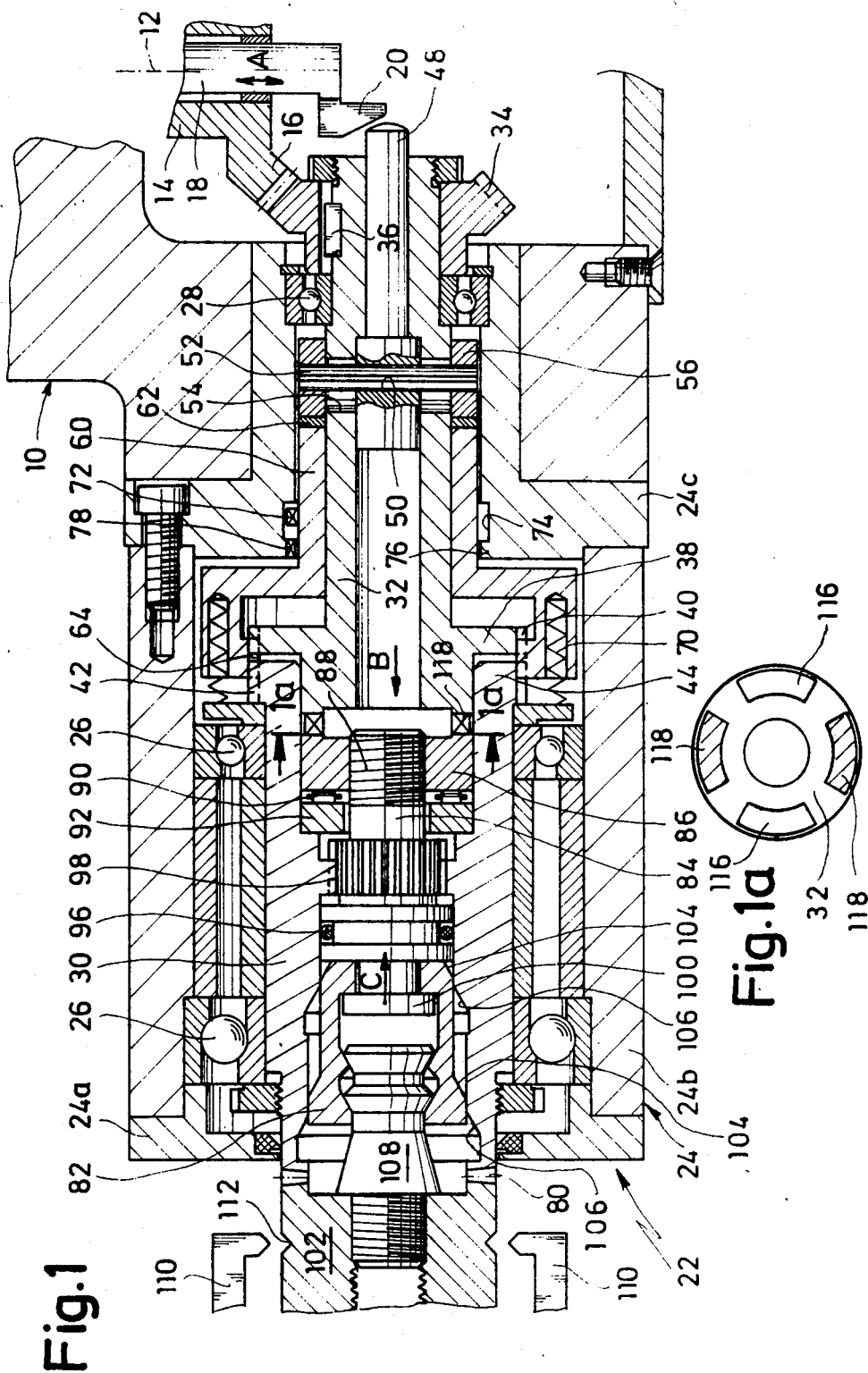
FIG. 1a is a section along line 1a—1a in FIG. 1.

FIG. 1 shows a tool turret body 10 which is intended to be rotatable about an indexing axis 12 and in which a central drive shaft 14 is intended to be rotatably mounted in a known manner. A bevel gear 16 is formed on the drive shaft 14. The drive shaft 14 is appropriately designed as a hollow shaft so that it can be penetrated by an indexing bar 18 which bears an actuating cam 20 at its front end and may be moved back and forth in the directions of the double-headed arrow A by drive means which are not illustrated.

The tool turret body 10 has a plurality of stations distributed around its circumference. One of these stations is equipped with the tool spindle unit 22 shown in FIG. 1. This tool spindle unit has a housing designated as a whole as 24 and consisting of the portions 24a, 24b and 24c. A tool spindle 30 and a drive shaft 32 are rotatably mounted in this housing by means of bearings 26 and 28. The end of the drive shaft 32 to the right in FIG. 1 bears a bevel gear 34 which engages with the bevel gear 16 and is non-rotatably connected with the drive shaft 32 via a wedge member 36. The drive shaft has, in the region of its left-hand end, an engaging flange 38 having peripheral teeth 40 corresponding to peripheral teeth 42 of the engaging flange 44 at the right-hand end of the tool spindle 30. The drive shaft 32 is designed as a hollow shaft and accommodates an actuating pin 48 which may be displaced in the direction of arrow B and out of the position shown in FIG. 1 with the aid of the indexing bar 18. This actuating pin bears, in a transverse bore 50, a spring cotter 52 which penetrates longitudinal recesses 54 in the drive shaft 32 and has been driven into transverse bores in an actuating sleeve 56 which is penetrated by the drive shaft 32 and rotates therewith.

In accordance with the invention, a coupling sleeve designated as a whole as 60 is rotatably mounted on the drive shaft 32. A bearing disc 62 may be arranged between the actuating sleeve 56 and the coupling sleeve 60. This coupling sleeve 60 overlaps the engaging flanges 38 and 44 with a bell-shaped member and has inner teeth 64 which may be slipped into the peripheral teeth 40 and 42 of drive shaft 32 and tool spindle 30 in axial direction. FIG. 1 shows the actuating pin 48 in its right-hand stop position of the coupling sleeve 60 which is constantly pressed to the right against the actuating sleeve 56 by return springs 70.

A tooth 72 is mounted on the circumference of the coupling sleeve. The coupling sleeve could, however, bear two such teeth offset relative to one another through an angle of 180°. So that the coupling sleeve 60 can rotate in the housing portion 24c, this has a recess 74 in its interior circumference which is limited to the left in FIG. 1 by a collar 76, in which a single locking notch 78 is located when one tooth 72 is present or, in the case of two teeth 72, two diagonally opposed locking notches 78. When the coupling sleeve 60 is displaced to the left in FIG. 1, it may be locked in one predetermined position of angular rotation or in two predetermined positions of angular rotation which differ from one another through an angle of rotation of 180°.

The tool spindle 30 designed as a hollow shaft is provided at its front end (left-hand end in FIG. 1) with Hirth teeth 80 and accommodates a tool chuck 82 designed as a known collet, a threaded spindle 84 and a nut 86. This nut is screwed into a threaded journal 88 of the threaded spindle 84 and is supported on the tool spindle 30 in axial direction, to the left in FIG. 1, via an axial needle bearing 90 and a support ring 92. The direction of pitch of the thread is selected such that, for example, when the nut 86 is rotated in a clockwise direction (when viewed from the right in FIG. 1) the threaded spindle 84 is drawn in the direction of arrow C, i.e. to the right. The nut 86 is hereby supported on the tool spindle 30, as mentioned, by the axial needle bearing 90.

An O-ring 96 inserted in a groove in the threaded spindle 84 appropriately prevents any dirt, coolant, cutting oil and the like penetrating the regions in the interior of the work spindle 30 located to the right of the O-ring in accordance with FIG. 1. The tool spindle 30 and the threaded spindle 84 are non-rotatably connected with one another via intermeshing splines 98. At its left-hand end according to FIG. 1, the threaded spindle 84 has a mushroom head 100 which engages in the chuck 82 and serves to draw the chuck to the right when the threaded spindle 84 is drawn to the right due to the nut 86 being turned. FIG. 1 shows the chuck 82 in its closed state, i.e. when clamping a tool 102. In order to close the chuck 82 two pairs of conical surfaces 104 and 106 are provided on the outer circumference of the chuck and the inner circumference of the tool spindle 30. These surfaces cause the chuck 82 to close when it is drawn to the right into its position shown in FIG. 1. In this case, it is not only a shank 108 of the tool 102 which is clamped. In view of the illustrated shape of the tool shank and of the chuck 82, the tool 102 is centered and drawn into the Hirth teeth 80 of the work spindle 30 by means of Hirth teeth on its reverse side.

A gripping means 110 of a tool changing system is indicated in FIG. 1. This gripping means can grasp the tool 102 at the positions designated 112.

As shown in FIGS. 1 and 1a, the left-hand end (according to FIG. 1) of the drive shaft 32 projects into the tool spindle 30. The drive shaft has, on its left-hand end face, two semi-circular claws 116 which engage between two claws 118 formed on the nut 86 so as to leave a clearance between them. They thus form a claw coupling which does, however, as shown in FIG. 1a, allow a certain clearance in the direction of rotation Any other type of claw coupling may, of course, be provided which allows a limited clearance in the direction of rotation between the nut 86 and the drive shaft 32.

Finally, it is to be mentioned that the length of the inner teeth 64 of the coupling sleeve 60 is such that they release the peripheral teeth 40 of the drive shaft 32 when the coupling sleeve 60 is displaced to the left, out of the position shown in FIG. 1, to such an extent that the tooth 72 engages in the locking notch 78.

The mode of operation of the embodiment shown in FIGS. 1 and 1a will now be explained in more detail.

When machining is intended to be carried out with the tool 102, the coupling sleeve 60 is located in the position shown in FIG. 1 in which it can rotate in the housing 24 and the drive shaft 32 is coupled with the tool spindle 30.

If the tool 102 is to be changed, the drive shaft 14 and, with it, the drive shaft 32 are driven at a slow rotational speed and the indexing bar 18 is displaced downwardly such that the actuating pin 48 and, with it, the coupling sleeve 60 are pressed towards the left, contrary to the force of the return springs 70, until the inner teeth 64 release the peripheral teeth 40 of the drive shaft 32 and the tooth 72 engages in the locking notch 78 and thus blocks the work spindle 30 which is now disengaged from the drive shaft 32. The tool 102 can now be grasped by the gripping means 110 of the tool changing system.

Subsequently, the direction of rotation of the drive shaft 14 is reversed. This means that the drive shaft 32, which rotated in a clockwise direction (seen from the right in FIG. 1) during displacement of the coupling sleeve 60 to the left in FIG. 1, should now rotate in an anticlockwise direction. It is also possible, however, to proceed in the reverse order. This causes a drive-screw type effect for releasing the nut 86. When the drive shaft 32 rotates in a clockwise direction the claws 116 abut on one end of each claw 118 such that the claws 116 travel through the clearance of the coupling 116, 118 once the direction of rotation is reversed and impact to initiate rotational movement of the nut 86. Via the drive shaft 32, the nut 86 is also supported in axial direction to the right, according to FIG. 1, on the housing portion 24c (via the bearing 28). Therefore, when the nut 86 turns in an anticlockwise direction the threaded spindle 84 and, with it, the chuck 82 are displaced to the left in FIG. 1 such that the chuck is opened in the manner known per se due to the conical surfaces provided in the work spindle 30 and releases the shank 108 of the tool 102, whereupon the tool is withdrawn by the gripping means 110 and can be replaced by another tool.

The direction of rotation of the drive shaft 14 is, subsequently, again reversed and the chuck 82 closed by the nut 86 turning in a clockwise direction. At the same time, the Hirth teeth of the new tool 102 are drawn into the Hirth teeth 80 of the tool spindle 30. The tool changing cycle is finally completed by releasing the actuating pin 48, i.e. by the indexing bar 18 being raised, so that the return springs 70 press the coupling sleeve 60 to the right. This occurs with the motor for the central drive shaft 14 switched off. If the inner teeth 64 of the coupling sleeve cannot be slipped into the peripheral teeth 40 of the drive shaft 32 by the return springs 70, the drive shaft 14 is switched briefly to anti-clockwise rotation (or clockwise rotation if the nut 86 and threaded journal 88 have a different direction of pitch), whereupon the drive shaft 32 and the tool spindle 30 are then non-rotatably connected with one another again via the coupling sleeve 60 and machining can be carried out with the new tool.

As a result of reversal of the direction of rotation of the drive shaft 32 during engagement or disengagement in or from the peripheral teeth 40 of the drive shaft 32, the claws 118 always have clearance in both directions of rotation during machining with a tool. This means that any impact stress on the tool 102 during machining cannot lead to the nut 86 being released or excessively tightened. In accordance with the invention, the gradient of the teeth 40, 42 and 64 is so fine that a plurality of positions of the coupling sleeve 60, with regard to angular rotation and relative to the drive shaft 32, are possible within the rotational clearance of the claws 116, 118 and so rotational clearance of the claws 118 is always guaranteed in conjunction with the abovementioned reversal of the direction of rotation.

If the coupling sleeve 60 always engages in the peripheral teeth 40 of the drive shaft 32 only in one particular direction of rotation of the drive shaft 32, it is recommended that the teeth of the coupling are inclined to facilitate insertion of the inner teeth 64 into the peripheral teeth 40. The same applies for the tooth 72 and the locking notch 78.

Figure 2:
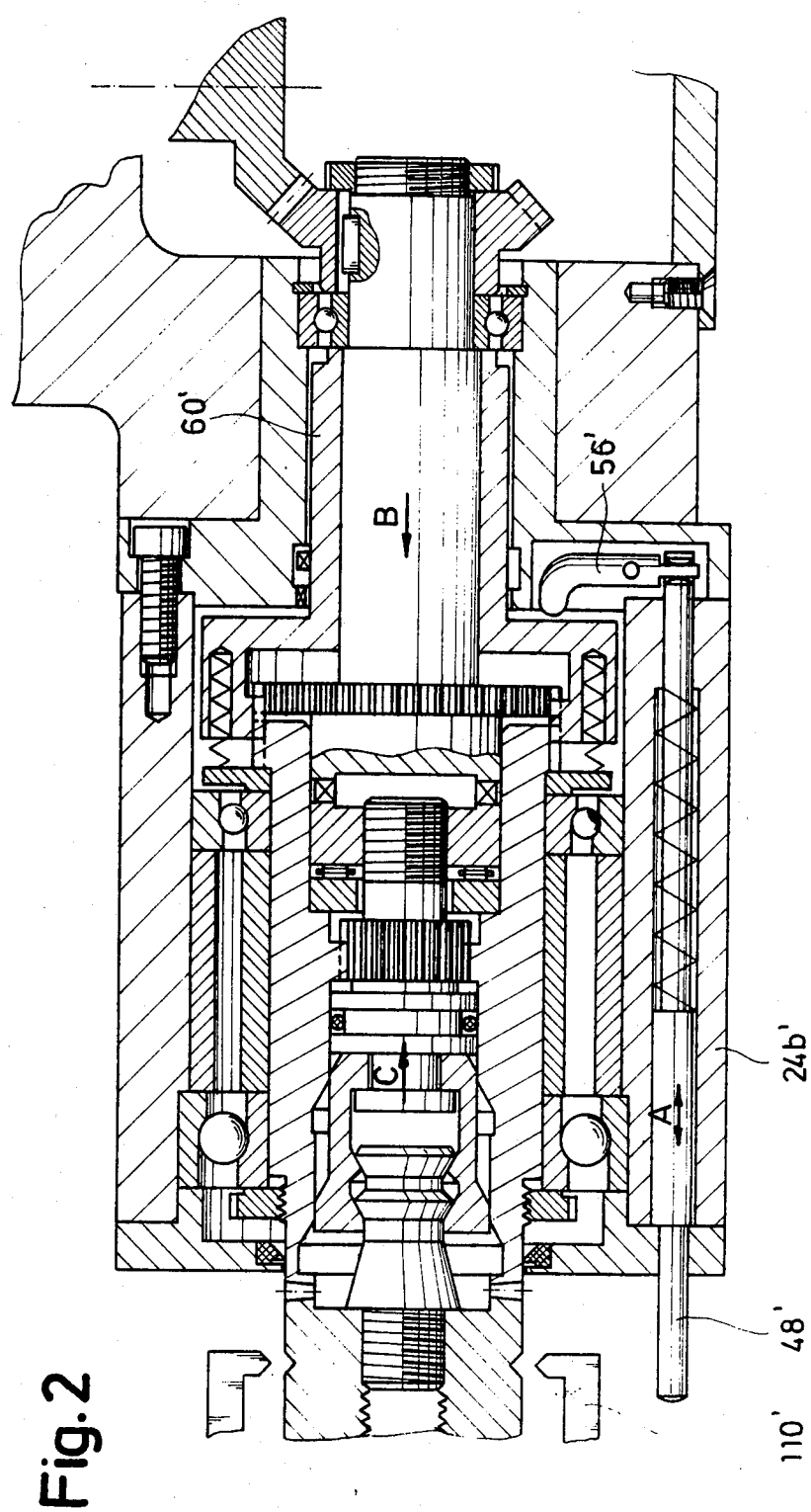
FIG. 2 is a section corresponding to FIG. 1 through a second star turret which differs from the embodiment of FIG. 1 only due to the manner in which the coupling between a drive shaft and the tool spindle is actuated.

As already mentioned, the embodiment shown in FIG. 2 differs from that shown in FIGS. 1 and 1a only in the manner in which the coupling sleeve is actuated. For this reason, the description of the embodiment shown in FIG. 2 can be limited to the means for actuating the coupling sleeve.

In this embodiment, an actuating pin 48' is guided for displacement in a housing portion 24b'. This pin pivots a twin-armed actuating lever 56' in an anticlockwise direction when the actuating pin is pressed into the housing portion 24b. In this way it is possible, with a correspondingly designed gripping means 110' of the tool changing system, to displace the coupling sleeve 60' to the left in FIG. 2 contrary to the action of its return springs. It is then unnecessary to provide a special actuating member, such as the indexing bar 18 of the embodiment according to FIG. 1.

As the embodiment of FIG. 3 functions, in principle, in the same manner as the embodiment of FIG. 1, only the most important parts of the embodiment according to FIG. 3 will be described in the following.

A drive shaft 32" is rotatably mounted in a housing portion 24c". This shaft bears on its left-hand end a bevel gear 120 which engage a bevel gear 122 of a drive element 124. A coupling sleeve 60" is constantly and non-rotatably connected with a tool spindle 30" via splines 64a" and may be coupled to or released from the drive element 124 due to axial displacement by means of relatively short splines 64b". FIG. 3 shows the engaged state. In addition, the coupling sleeve 60" is again provided with a tooth 72" which may be inserted into a locking notch 78" in a housing portion 24a" in order to lock the coupling sleeve 60" and, with it, the tool spindle 30" in position.

Figure 3:
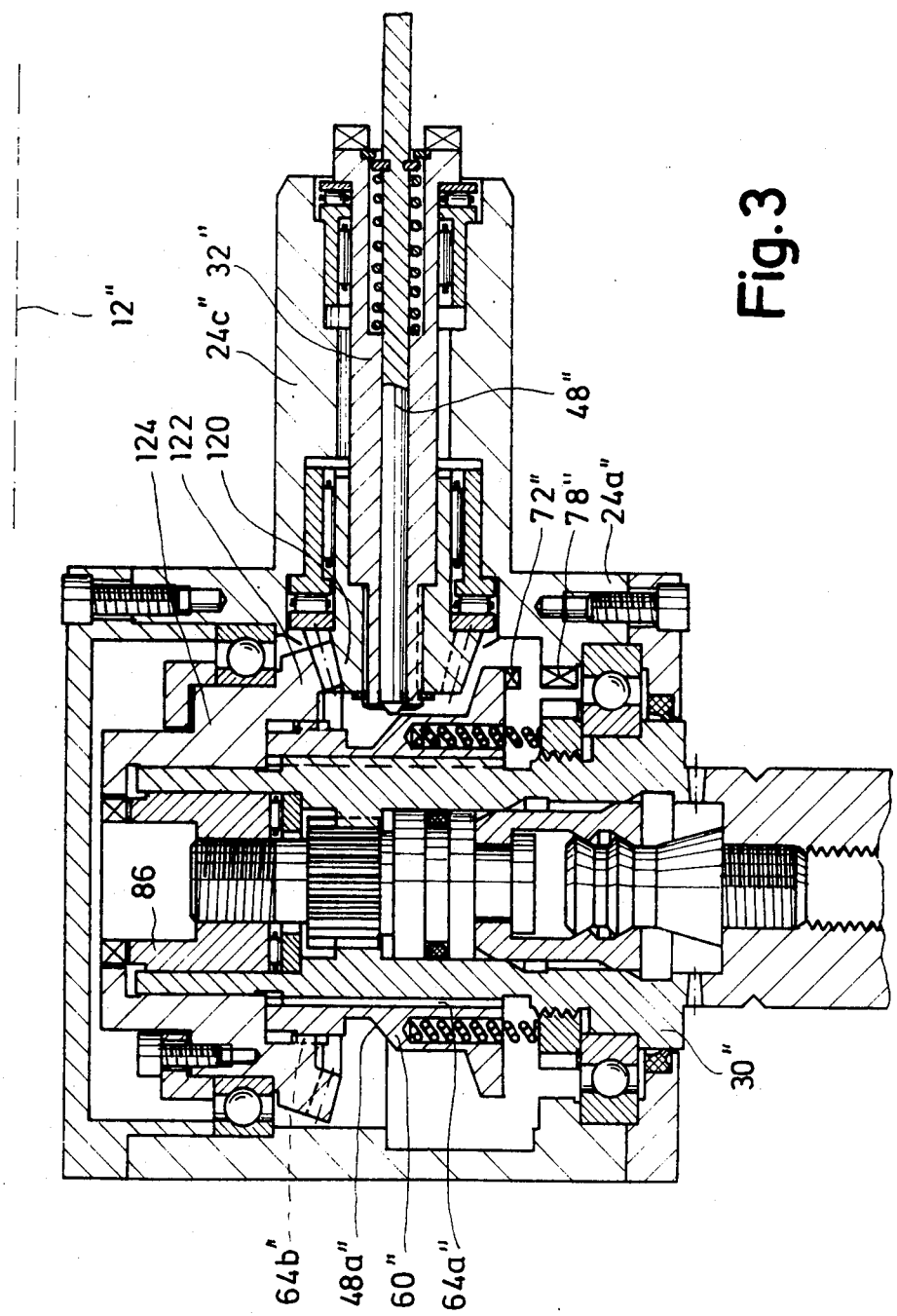
FIG. 3 is an axial section through a tool spindle unit which has an angular drive and would be suitable for a so-called disc turret, the indexing axis of which is indicated in FIG. 3 by a dash-dot line.

The coupling sleeve 60" is actuated by an actuating pin 48" which is shown in FIG. 3 in its inoperative position and cooperates with a conical surface 48a" on the coupling sleeve 60" such that any displacement of the actuating pin 48" to the left causes the coupling sleeve 60" to be displaced downwards.

Figure 4:
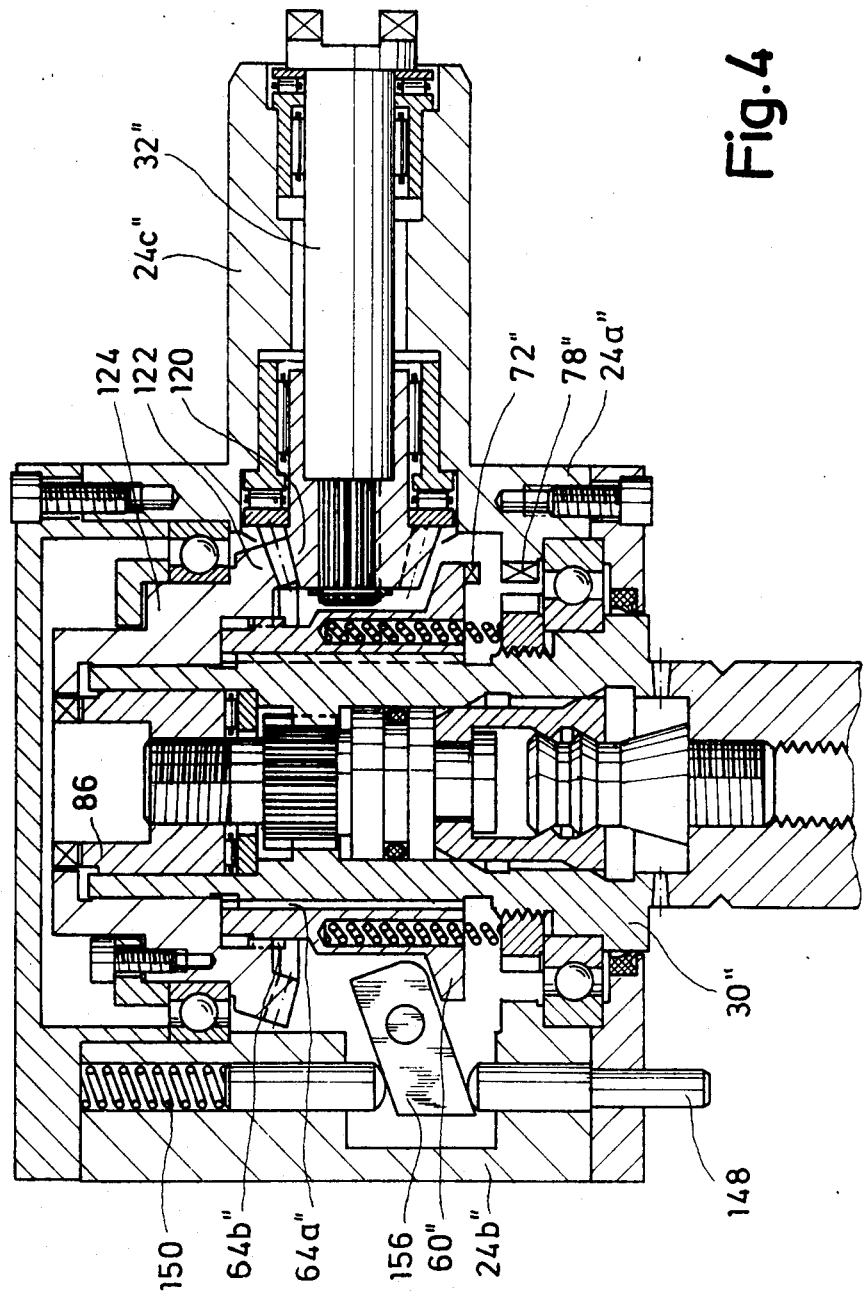
FIG. 4 is an axial section corresponding to FIG. 3 through a tool spindle unit which differs from that of FIG. 3 only due to the manner in which the coupling is actuated.

The embodiment of FIG. 4 again differs from that of FIG. 3 only in the manner in which the coupling sleeve 60" is actuated. A twin-armed actuating lever 156 is mounted in a housing portion 24b". This lever may be pivoted by an actuating pin 148 contrary to the action of a return spring 150. In the embodiment of FIG. 4 it is then possible, just as in the embodiment of FIG. 3, to actuate the coupling sleeve by means of the gripping means of the tool changing system.

As shown by the foregoing description of the invention, it is in no way necessary to connect the second threaded element, e.g. the threaded journal 88 of the embodiment according to FIG. 1, directly or indirectly with the tool to be clamped in both axial directions. It is, for example, completely adequate to have clamping movement generated by rotation of the two threaded elements against one another whereas a spring could, for example, be used for release movement. As already mentioned, it would also be completely adequate for the first threaded element, i.e. the nut 86 in the embodiment of FIG. 1, which is driven by the drive element, e.g. the drive shaft 32 of the embodiment according to FIG. 1, to be supported only in one axial direction relative to the tool spindle.

Figure 5:
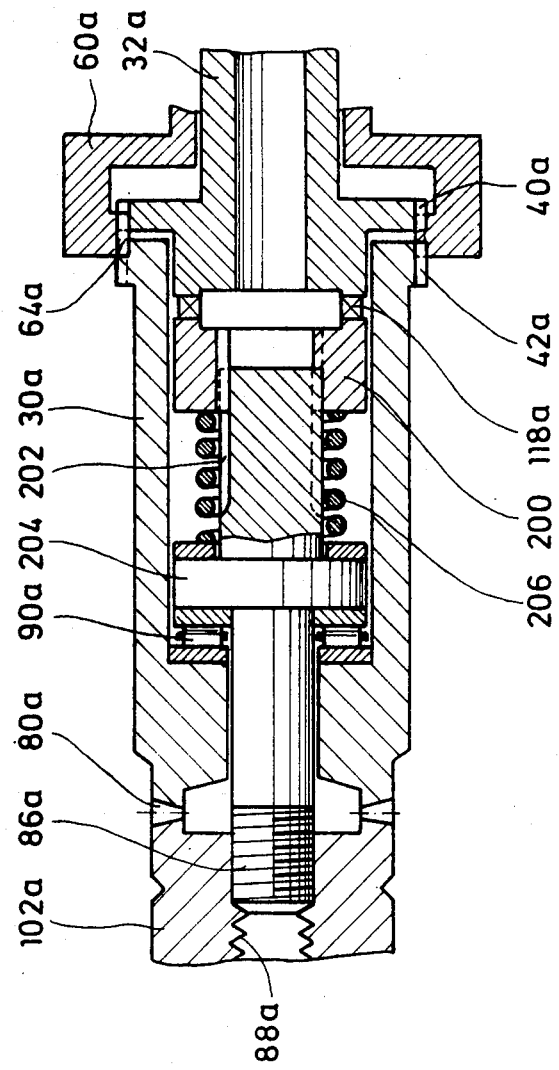
FIG. 5 is an axial section through a further tool spindle unit.

FIG. 5 illustrates only those parts of a further embodiment which are necessary for its better understanding. Since this embodiment is based on that of FIG. 1, the same reference numerals as in FIG. 1 have mainly been used but with the addition of the letter "a". FIG. 5 shows a drive shaft 32a, on which a coupling sleeve 60a is rotatably mounted. The latter has inner teeth 64a which are insertable into peripheral teeth 40a and 42a on the drive shaft 32a and a tool spindle 30a, respectively. Claws 118a are formed on the drive shaft 32a and engage between claws of a coupling ring 200, which are not illustrated, so as to leave clearance between them, as shown with the claws 116, 118 of the embodiment according to FIGS. 1 and 1a.

The nut 86 of the embodiment according to FIG. 1 is replaced in the embodiment of FIG. 5 by a threaded journal 86a which is non-rotatably connected with the coupling ring 200 via splines 202 and is supported on the tool spindle 30a in axial direction by means of a collar 204 via an axial bearing 90a.

A tool 102a equipped with a shank has as second threaded element a threaded bore 88a into which the threaded journal 86a is screwed. When the latter is turned, Hirth teeth 80a on the reverse side of the tool 102a and on the front end face of the tool spindle 30a may be drawn into one another to clamp the tool on the tool spindle. The coupling ring 200 is displaceable along the threaded journal 86a in axial direction. A spring 206 serves to keep the claw coupling, formed by the parts 32a and 200, pressed together and to press the threaded journal 86a into the threaded bore 88a when the tool is pressed into the Hirth teeth 80a by a gripping means and the drive means for the tool spindle 30a is switched on.

The embodiment of FIG. 5 shows that one of the two threaded elements of the inventive tool holding device, namely the second threaded element 88a need not be a component part of the actual tool holding device.

What is claimed is:

1. A tool carrier, in particular a tool turret, comprising a housing (10), a tool spindle (30) in the form of a hollow shaft, means mounting the tool spindle within said housing for rotation about a spindle axis, tool driver means carried by the tool spindle for rotating a tool (102, 108) about the spindle axis, a first threaded element (86), arranged in said tool spindle coaxially thereto, said first threaded element being rotatable relative to said tool spindle about its axis for cooperation with a second threaded element (88) for axially tightening a tool against a seat (80) of said tool driver means, and a spindle drive element (32) also coaxial to said tool spindle for driving the same, wherein (a) drive connection means (116, 118) are provided for rotating said first threaded element (86) by said spindle drive element (32), and (b) releasable clutch means (60, 64, 40, 42) are provided for coupling said spindle drive element (32) with said tool spindle (30), said clutch means comprising a clutch element (60) shiftable along the spindle axis between a first axial position in which said spindle drive element is coupled with the tool spindle, and a second axial position in which said first threaded element (86) is rotatable by said spindle drive element without rotation of the tool spindle.

2. A tool carrier as defined in claim 1, wherein said clutch means comprise locking means (72, 78) for coupling the tool spindle with the housing when said clutch element is in its second axial position.

3. A tool carrier as defined in claim 1, wherein said clutch element is in the form of a sleeve (60) coaxial to said tool sprindle (30), and wherein for coupling said spindle drive element (32) with said tool spindle said sleeve is axially displaceable over engaging zones (38, 44) of said tool spindle and said spindle drive element and is positively connectable with said engaging zones in the direction of rotation.

4. A tool carrier as defined in claim 3, wherein said sleeve (60) and said engaging zones (38, 44) are provided with sets of teeth (64, 40, 42) fitting slidably into one another.

5. A tool carrier as defined in claim 2, wherein said clutch element is in the form of a sleeve (60) coaxial to said tool spindle (30), wherein for coupling said spindle drive element (32) with said tool spindle said sleeve is axially displaceable over engaging zones (38, 44) of said tool spindle and said spindle drive element and is positively connectable with said engaging zones in the direction of rotation and wherein said sleeve (60) and said housing (24) are each provided with at least one locking element (72, 78) such that by axial displacement of said sleeve the latter is non-rotatably connectable with said housing in at least one defined position of angular rotation.

6. A tool carrier as defined in claim 1, wherein said drive connection means (116, 118) is provided with clearance in the direction of rotation.

7. A tool carrier as defined in claim 1, wherein said first threaded element (86) is constantly in drive connection with said spindle drive element (32) via stops (116, 118) acting in both directions of rotation.

8. A tobl carrier as defined in claim 1, wherein in said tool spindle (30) a nut (86) as said first threaded element is rotatable mounted on a threaded journal (88) forming said second threaded element and connectable in axial direction with a tool (102) to be clamped.

9. A tool carrier as defined in claim 1, wherein locking means (98) are provided for locking said second threaded element (88) against rotation relative to said tool spindle.

* * * * *